United States Patent [19]

Baar, Sr.

[11] 3,991,415

[45] Nov. 9, 1976

[54] ALARM AND LIGHT SYSTEM

[76] Inventor: Haward A. Baar, Sr., Rte. 4, Box 167, Mechanicsville, Va. 23111

[22] Filed: Oct. 2, 1975

[21] Appl. No.: 618,740

[52] U.S. Cl. .................................. 340/272; 340/326

[51] Int. Cl.[2] .................... G01D 21/04; G08B 13/10

[58] Field of Search ............................. 340/326, 272

[56] References Cited

UNITED STATES PATENTS

| | | | |
|---|---|---|---|
| 620,513 | 2/1899 | Thorsen | 340/272 |
| 901,540 | 10/1908 | Lindsey | 340/326 |
| 1,661,994 | 3/1928 | Brown | 340/326 |
| 2,625,621 | 1/1953 | Roby | 340/272 |
| 2,637,801 | 5/1953 | Kelley | 340/326 |
| 3,886,352 | 5/1975 | Lai | 340/326 |

*Primary Examiner*—Thomas B. Habecker

[57] ABSTRACT

A combination alarm and lighting system for being installed in a home so that when a person steps upon a door mat outside of the door home it closes an electrical circuit to a door bell and an electric lamp; the system accordingly including electrical circuit that includes in addition to the bell and lamp also a novel electrical switch contained within the interior of the door-mat.

5 Claims, 6 Drawing Figures

ALARM AND LIGHT SYSTEM

This invention relates generally to alarm apparatus.

A principal object of the present invention is to provide an alarm and light system which would serve to frighten away intruders at night time by stepping upon a door-mat in front of a door, thus causing an electric light to come on and a bell to ring.

Another object of the present invention is to provide an alarm and light system which additionally serves a family when coming home after dark, and with no lights having been left on, the present invention thus immediately furnishing illumination when stepping upon the door-mat so that a person can more easily locate the key hole so to unlock the door.

Still a further object of the present invention is to provide an alarm and light system which serves residents when coming home with their arms full of groceries for other items so that when stepping upon the door-mat, a bell rings inside the home so to inform anyone at home to come open the door, thus eliminating the necessity of the person to put down his bundles or bags of groceries.

Still another object of the present invention is to provide an alarm and light system wherein even if the porch light bulb goes bad, the door-bell would still ring.

Still a further object is to provide an alarm and light system which would not be activated by children who weigh less than 50 lbs. so that children playing out of doors in front of the door would thus not cause a parent at home to have to come to the door whenever a child steps upon the mat.

Still a further object is to provide an alarm and light system which can be installed either at a front or back door, or at both doors as well as other locations, as desired.

Other objects are to provide an alarm and light system which is simple in design, inexpensive to manufacture, rugged in construction, easy to use and efficient in operation.

These and other objects will be readily evident upon the study of the following specification and the accompanying drawings wherein.

Figure 1:
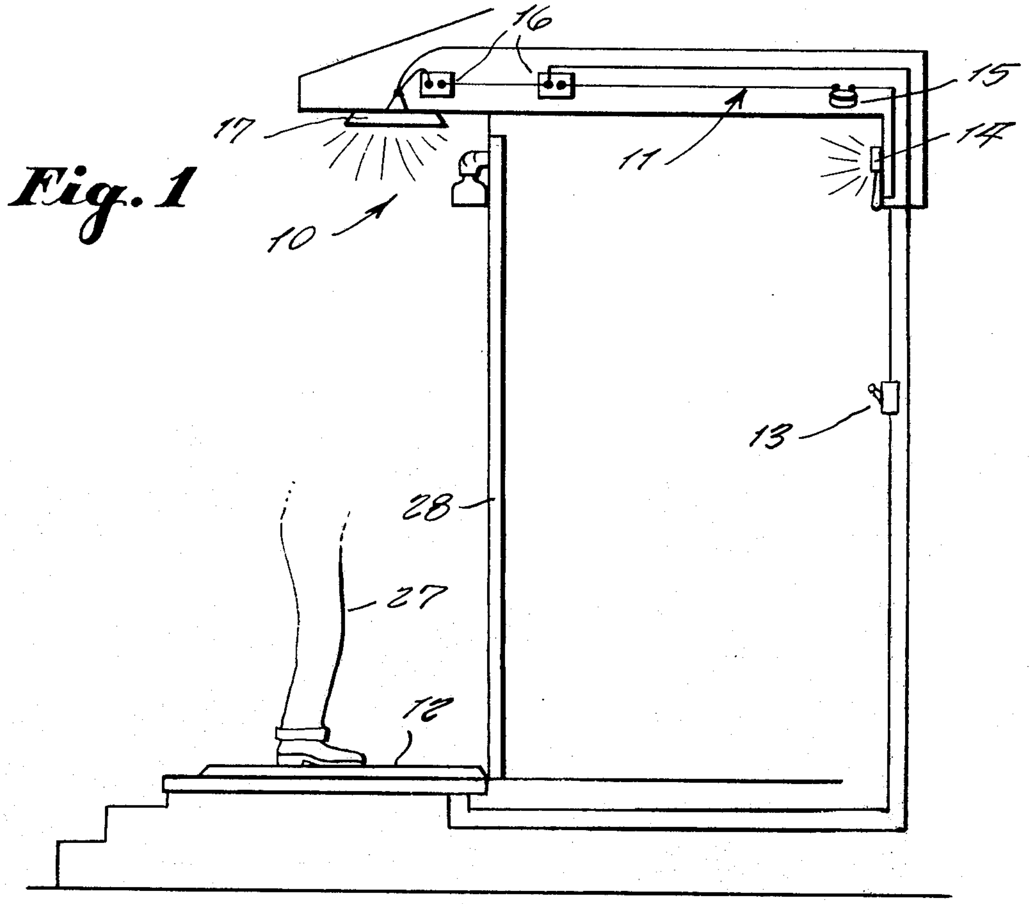
FIG. 1 is a diagram of the present invention shown installed in a home.

Refering now to the drawings in detail, the reference numeral 10 represents an alarm and light system according to the present invention and which comprises an electrical circuit 11 located between an electrical power source and a porch pad or door-mat 12, a wall cut off switch 13, a door bell 14, a flasher 15, transformer 16 and a lamp of a porch light 17. The transformer 16 may comprise to two standard door bell transformers 16 as shown and which provide a 110 to 115 current. The door bell 17 can be of 16 volts and a flasher may be 12 volts, the flasher giving a pause during the ringing operation. Alternately instead of a bell, a buzzer may be employed. The wall cut off switch is on the low voltage side to the pad.

Figure 4:
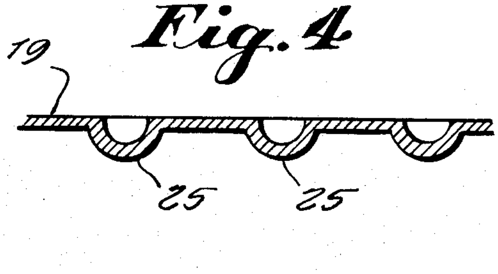
FIG. 4 is an enlarged cross-sectional, view taken on line 4—4 of FIG. 3.
Figure 5:
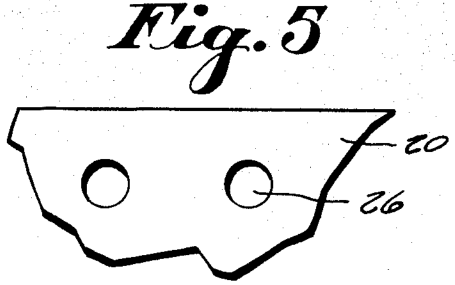
FIG. 5 is a plan view of a rubber pad of FIG. 3, shown fragmentarily.
Figure 6:
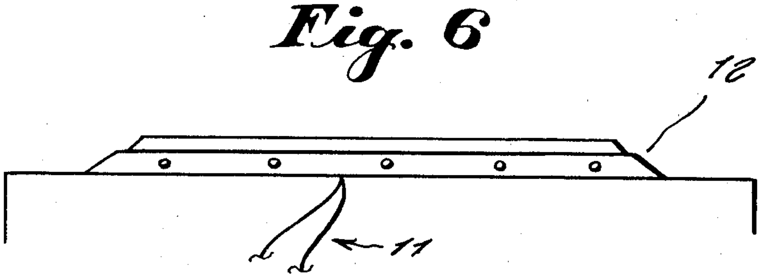
FIG. 6 is a side view of the assembled invention of porch mat placed upon a porch and showing the wires going downwardly therefrom.

The door mat 12 is constructed to include a thin rubber, a grooved pad 18 and which is located over a thin gauge metal plate 19 which is directly above a relatively thick rubber pad 20 located over a thin gauge metal plate 21 that is positioned over a 1/16 inch thick rubber base 21*a*. An aluminum frame 22 is placed over the upper edge of the thin, rubber grooved mat or pad 18 and secures the components 18, 19, 20 and 21 over each other by means of a plurality of screws 23 fitted through screw openings 24 of the aluminum frame and into the bottom thin gauge metal plate 21. Thus the door mat is assembled. As shown in FIG. 4, it is to be noted that the thin gauge metal plate 19 has a plurality of downwardly extending contact points 25 formed therein, each of downwardly extending contact points 25 being alined with a plurality of circular openings 26 extending through the rubber pad 20. While the contact points 25 extend downwardly only one quarter of an inch the pad 20 is made between ⅜ to ½ inch thick so that the bottom of the contact points 25 does not normally come into engagement with the thin gauge metal plate 21 unless the person of substantial weight stands upon the rubber mad 18 and his weight squeezes the rubber pad 20, compressing it together so that the bottom of the contact points comes into engagement with the thin gauge metal plate 21 and thus closes an electrical circuit. It will be noted that the children weight less than 50 lbs. will not be able to sufficiently compress the rubber pad 20 to less than one quarter of an inch in thickness so to effect the electrical contact.

Figure 2:
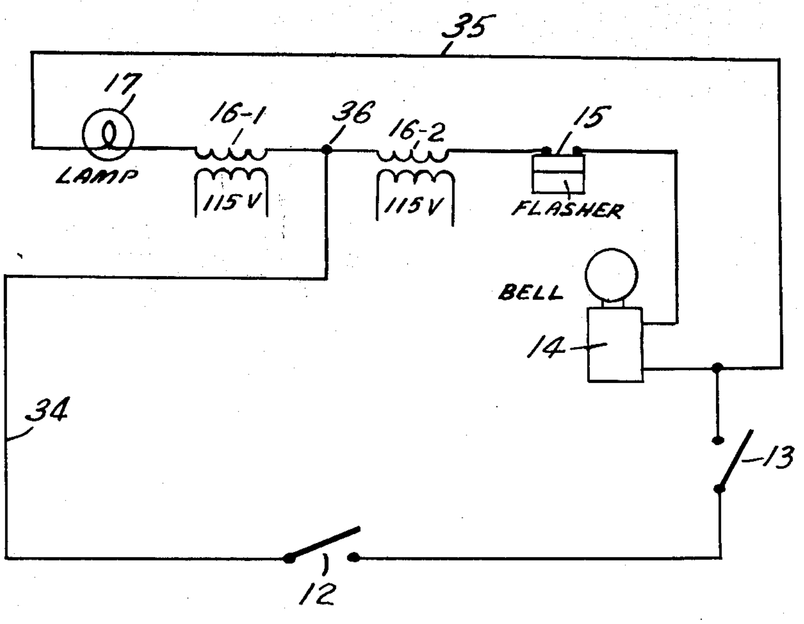
FIG. 2 is an assembly of the invention components.
Figure 3:
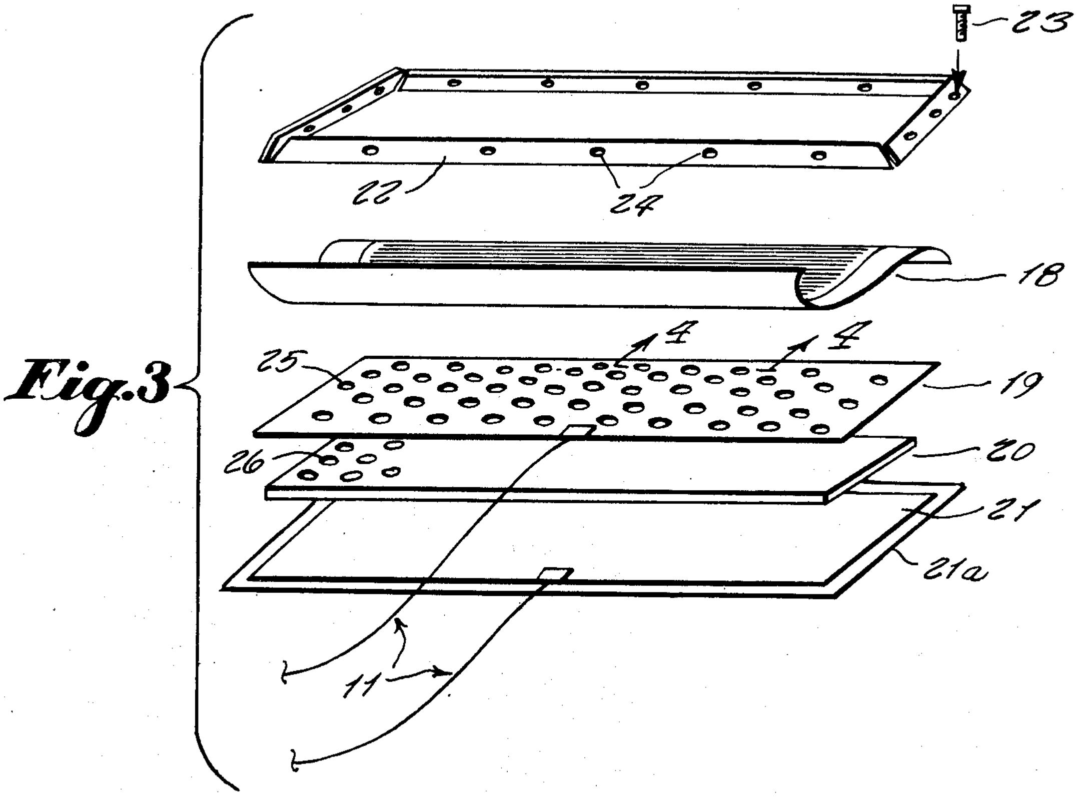
FIG. 3 is an exploded perspective view of the elements of the porch mat.

The wiring of the electrical circuit shown in FIG. 2 shows three wires going to the bell, and the two wires leading to the door mat carry 16 to 32 volts for purposes of safety.

As shown in FIGS. 1 and 2, the lamp 17 and buzzer or bell 14 are in two separate low voltage circuits supplied from step down transformers 16-1 and 16-2, respectively, and the circuits are commonly controlled by doormat switch 12. The low voltage circuit for lamp 17 includes the secondary of transformer 16-1, the lamp 17, a line 35 to one side of bell or buzzer 14 through circuit switch 13 to the door mat or pressure switch 12 and then the circuit is completed by wire 34 with runs from switch 12 to the intermediate point 36 between low voltage or step down transformers (secondaries) 16-1 and 16-2.

The low voltage circuit for bell or buzzer 14 includes one side of step down transformer secondary winding 16-2, flasher 15, buzzer or bell 14, cut out switch 13, door mat or pressure switch 12, wire 34 to intermediate point 36 and the other side of the step down transformer 16-2.

In this way if the lamp or buzzer fail, the other will still operate.

In operative use, as shown in FIG. 1, when a person 27 steps upon the door mat 12, placed in front of door 28, the electrical circuit 11 is closed by means of contact points 25 electrically engaging thin metal gauge plate 21 so to cause the light 17 to go on and the bell 14 to ring.

While various changes may be made in the detailed construction, it is understood that such changes will be within the spirit and the scope of the present invention as is defined by the appended claims.

What I claim is:

1. An alarm and light system comprising a first low voltage circuit, said first low voltage circuit including a first low voltage source and an audible alarm electrically connected to and actuatable by said first low voltage source to produce an audible alarm upon actuation thereof, a second low voltage circuit, said second low voltage circuit including a second low voltage source and an electrical lamp means connected in circuit with said second low voltage source for providing illumination upon actuation thereof, a weight operated switch commonly connected in series with each said low voltage circuits to supply electrical power to said audible alarm and said electrical lamp, respectively, upon actuation thereof, said weight operated switch being included in a door mat responsive to the weight for closing said switch.

2. The invention set forth in claim 1 wherein each said low voltage source is a step down transformer, and including means to give a pause during the audible alarm operation.

3. The invention as set forth in claim 1, wherein said door mat is comprised of a thin rubber grooved mat for being stood upon by a person, a thin gauge metal plate located directly below said thin rubber groved mat, a relatively thick rubber pad below said thin gauge metal plate and a second thin gauge metal plate being located below said rubber pad.

4. The invention as set forth in claim 3, wherein said thin gauge metal above said rubber pad is provided with a plurality of downwardly extending contact points, said rubber pad having a plurality of openings therethrough aligned with said contact points, and said rubber pad openings going through rubber material that is thicker than the downward length of said contact points.

5. The invention set forth in claim 4 wherein the weight of a person on said pad must be greater than 50 pounds before said switch closes.

* * * * *